United States Patent
Kong et al.

(10) Patent No.: US 7,453,877 B2
(45) Date of Patent: Nov. 18, 2008

(54) METHOD OF TRANSMITTING DATA SERVICE ON SYNCHRONOUS DIGITAL NETWORK

(75) Inventors: Lingguang Kong, Shenzhen (CN); Jianfei He, Shenzhen (CN); Yong Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 585 days.

(21) Appl. No.: 11/108,422

(22) Filed: Apr. 18, 2005

(65) Prior Publication Data

US 2006/0013215 A1   Jan. 19, 2006

Related U.S. Application Data

(63) Continuation of application No. PCT/CN03/00699, filed on Aug. 20, 2003.

(30) Foreign Application Priority Data

Oct. 18, 2002   (CN) .............................. 02 144190

(51) Int. Cl.
  *H04L 12/28* (2006.01)
  *H04L 12/56* (2006.01)
  *H04J 3/16* (2006.01)
  *H04J 3/22* (2006.01)

(52) U.S. Cl. .................. 370/392; 370/404; 370/471

(58) Field of Classification Search ................ 370/230, 370/230.1, 231, 232, 235, 254, 255, 258, 370/389, 392, 395.21, 395.41, 395.42, 395.51, 370/404, 424, 449, 452, 458, 460, 468, 471, 370/474, 477, 907
See application file for complete search history.

(56) References Cited

U.S. PATENT DOCUMENTS

2003/0074469 A1*   4/2003   Busi et al. .................. 709/238

(Continued)

FOREIGN PATENT DOCUMENTS

EP   1 006 751 A3   6/2000

(Continued)

OTHER PUBLICATIONS

Italo Busi, Sonet/SDH Virtual Concatenation for RPR, Sep. 12, 2001, Alcatel, pp. 4, 10 and 13.*

(Continued)

*Primary Examiner*—Chirag G Shah
*Assistant Examiner*—Ashley L Shivers
(74) *Attorney, Agent, or Firm*—Marshall, Gerstein & Borun LLP

(57) ABSTRACT

A method for data traffic transmission on a synchronous digital network to overcome the inefficiency of the data packet transmission on the synchronous digital network equipment. The method includes, adding a RPR processing module after Ethernet interface in the equipment; through the RPR processing module, an uplink Ethernet frame from Ethernet interface being mapped to a RPR frame; through LAPS/PPP/GFP protocol, the RPR frame being mapped into the payload of a synchronous digital network; the volume and number of the VCs and total bandwidth of the RPR being configurable. When the RPR frame arrives at the destination node of the RPR, it is stripped from the RPR and recovered to its original Ethernet frame. The method and device transmit data service efficiently, and the total bandwidth of the RPR is adjustable and is statistically multiplexed.

9 Claims, 4 Drawing Sheets

U.S. PATENT DOCUMENTS

2003/0163593 A1* 8/2003 Knightly .................... 709/251

FOREIGN PATENT DOCUMENTS

| EP | 1 006 751 B1 | 6/2000 |
| EP | 1 248 420 A2 | 10/2002 |
| EP | 1 248 420 A3 | 10/2002 |
| WO | WO 00/74286 | 12/2000 |

OTHER PUBLICATIONS

Marc Holness, William Dai, Robert Castellano and Vinay Bannai, 802.17 Frame Structure and Bridging Ad-Hoc Support, May 2002, IEEE, pp. 9 and 13.*
Canadian Office Action for Application No. 2,502,111, dated Oct. 28, 2005.
Canadian Office Action for Application No. 2,502,111, dated Sep. 14, 2007.
International Search Report in PCT/CN03/00699 dated Nov. 20, 2003.

* cited by examiner

METHOD OF TRANSMITTING DATA SERVICE ON SYNCHRONOUS DIGITAL NETWORK

CROSS-REFERENCE TO RELATED APPLICATION

This is a continuation of International Application No. PCT/CN2003/000699 filed Aug. 20, 2003, the entire disclosure of which is incorporated herein by reference.

FIELD OF THE TECHNOLOGY

The disclosure relates to a method for data traffic transmission on a synchronous digital network, which can be a SDH network with European standard or a SONET with North American standard.

BACKGROUND OF THE DISCLOSURE

The Resilient Packet Ring (RPR) technology is a packet transmission technology, which combines the advantages of the Ethernet, ATM, and Synchronous Digital Hierarchy. The RPR makes use of the QoS feature of the ATM, the statistical multiplexing and simplicity of the Ethernet, and the protection feature of the SDH to transmit data traffic efficiently and safely.

The RPR is a duplex-fiber ring structure, as shown in FIG. 1, and each fiber can transmit data packets. For distinction, one ring is called "inner ring" and another is "outer ring." During the RPR operation, the data packet is transmitted in one direction and at the same time the control packet is transmitted in the opposite direction. In this way, the two fibers are used simultaneously, and this will speed up the control signal transmission.

The characteristics of the RPR technology can be summarized as follows:

1. Topology discovery and protection. Based on the network topology structure, the RPR selects a shortest path for data transmission. The inner ring and outer ring can transmit data frame simultaneously, so efficiency is doubled compared to the SDH network. The RPR has the ability to protect a single span (node or filter) failure within 50 ms.

2. Spatial reuse. RPR deploys the Destination-Stripping protocol; its unicast packets are stripped at their destination, unlike the FDDI, which deploys Source Stripping protocol, where circuits consume bandwidth around the whole ring, and RPR allows bandwidth to be used on idle spans.

3. Fairness algorithm. RPR supports fairness allocation of bandwidth with a fairness algorithm, which provides total bandwidth fairness allocation and part bandwidth fairness allocation. With this fairness algorithm, the QoS can be guaranteed.

At present, two schemes as shown in FIG. 2 are applied to transmit data traffic in synchronous digital network equipment. The first scheme is the EOS. The data frame from the Ethernet interface is encapsulated based on protocol and made rate adoption directly, then is mapped to the Virtual Container of synchronous digital network and is transmitted in a point-to-point manner though nodes of the SDH. The second scheme includes the step of inserting a Layer 2 Switch module in a Ether Ring after the Ethernet interface, and transmitting the data that has been processed by the Layer 2 Switch module on the synchronous digital network. Since the multi-service transport platform is based on the SDH/SONET and supports the Layer 2 Switch module, the data frame exchange between Ethernet interface on the user side and the VC channel on the network side can be performed based on Ethernet linkage layer.

The first scheme has the following disadvantages.

(1) It does not support bandwidth statistical multiplexing. The bandwidth of each node in the SDH is fixed and can only be used by its own node, so if its own node is idle, other nodes cannot use the idle bandwidth.

(2) Only point-to-point connection is implemented so that traffic convergence of point to multi-point cannot be implemented. Since the SDH/SONET implements only point-to-point transmission, the EOS scheme can only implement point-to-point transmission. Therefore, traffic convergence cannot be implemented at a convergence node.

(3) Implementation is complex. Due to the connection-orientation characteristic of the SDH/SONET and uncertain bandwidth of EOS, SDH/SONNET has several selectable virtual concatenations, such as VC12, VC3, or VC4, and implementation of them is complex when there are many nodes and connection-oriented characteristic exists, N×N connection is applied.

The second scheme overcomes disadvantages of the first scheme, but it has its own disadvantages, too.

(1) Bandwidth is unfairly distributed. In the second scheme, there is no access bandwidth control mechanism at each node of the Ether Ring, so each node may compete for the ring bandwidth, and the source node that is nearer the destination node takes more bandwidth. This is unfair for other nodes in the Ether Ring.

(2) QoS is worse. Every node takes store-and-forward mode for traffic transmission, so jitter and latency-sensitive service, such as VOIP service, cannot have high priority for transmission.

(3) Protection switching duration is long. Once a span fails, only the spanning tree protocol can be used for protection; its protection switching duration is usually several minutes so that protection switching duration within 50 ms cannot be met.

SUMMARY OF THE DISCLOSURE

The disclosure provides a transmission method for data traffic on the SDH/SONET. This method provides data traffic transmission with high efficiency, and further provides adjustable and statistically multiplexed RPR bandwidth.

A method for data traffic transmission on a synchronous digital network (SDH) includes A. adding a RPR (Resilient Packet Ring) processing module after a Ethernet interface;

B. mapping an uplink Ethernet frame from Ethernet interface to a RPR frame by the RPR processing module;

C. mapping the RPR frame to a SDH payload based on an encapsulation protocol;

D. stripping the RPR frame from the frame destination node at RPR, and recovering to original Ethernet frame.

In a preferred embodiment, Step B includes adding a RPR packet header to the Ethernet frame to form the RPR frame.

The step of adding a RPR packet header to the Ethernet frame may include,

B1. analyzing the Ethernet frame destination address, and looking for a node number of a SDH node corresponding to the destination address; filling the node number in a MAC NDA field, and a node number of a SDH node which sends the RPR frame in a MAC NSA field; and adding a RPR header according to IEEE 802.17 protocol;

B2. based on said Ethernet frame content, filling other field of the RPR packet header.

Step B2 may include,

If the Ethernet frame is a data frame, filling other fields of the RPR packet header with a protocol type, a checksum of the RPR header, user data and a FCS;

If the frame is a RPR fairness algorithm frame, filling the other field of said RPR packet header with fairness control information and a FCS;

If said frame is a RPR control frame, filling the other field of the RPR packet header with a protocol type, a checksum of the RPR header, control information and a FCS.

The step of adding the RPR packet header to said Ethernet frame may be performed by a large-scale programmable logic chip or a network processor.

Preferably, the encapsulation protocol is a Link Access Protocol (LAPS), a Point-to-Point Protocol (PPP) or a General Framing Protocol (GFP).

Preferably Step C includes: mapping the RPR frame to a virtual concatenated VC, configuring volume and number of the VCs and adjusting a bandwidth of said whole RPR.

Preferably, the step of adjusting a bandwidth of the whole RPR comprises, adjusting a bandwidth parameter of a RPR ring controller, adjusting a weighted value of lower priority data-stream based on the RPR protocol draft; at the same time configuring a bandwidth for uplink data-stream at a Layer 2 Switch module, and when there is congestion, discarding data that excess the configured bandwidth.

Highly preferably, the step of adjusting a bandwidth of said whole RPR includes, allocating each traffic bandwidth for RPR nodes to make that local bandwidth of the RPR can be dynamically allocated.

Preferably Step D includes,

D1. detecting whether FCS in the RPR frame is right; if it is error, discarding the RPR frame, otherwise going to Step D2;

D2. detecting whether the MAC NDA field of the RPR frame is consistent with the node number of the current node; if it is, stripping the RPR frame, otherwise forwarding the RPR frame to next node;

D3. taking off the RPR header, the MAC NDA, the MAC NSA and other field to recover to original Ethernet frame.

Compared with prior technology, the disclosed method and device have the following advantages.

1) Implementation is simple. The RPR is inserted in the original synchronous digital network, so new investment and rebuilding devices are avoided;

2) The total bandwidth of the RPR is adjustable;

3) Statistical multiplexing bandwidth is implemented in each node of the RPR;

4) Transmission for point-to-point and point to multi-point is implemented;

5) Allocation of bandwidth is fairness, and priority traffic is supported, so it provides better QoS for voice service such as VOIP service;

6) Protection switching duration is within 50 ms, which is implemented referring to the Bellcore standard.

DETAILED DESCRIPTION OF THE DRAWINGS

The disclosed method will be described in more detail with reference to the drawings.

Figure 1:
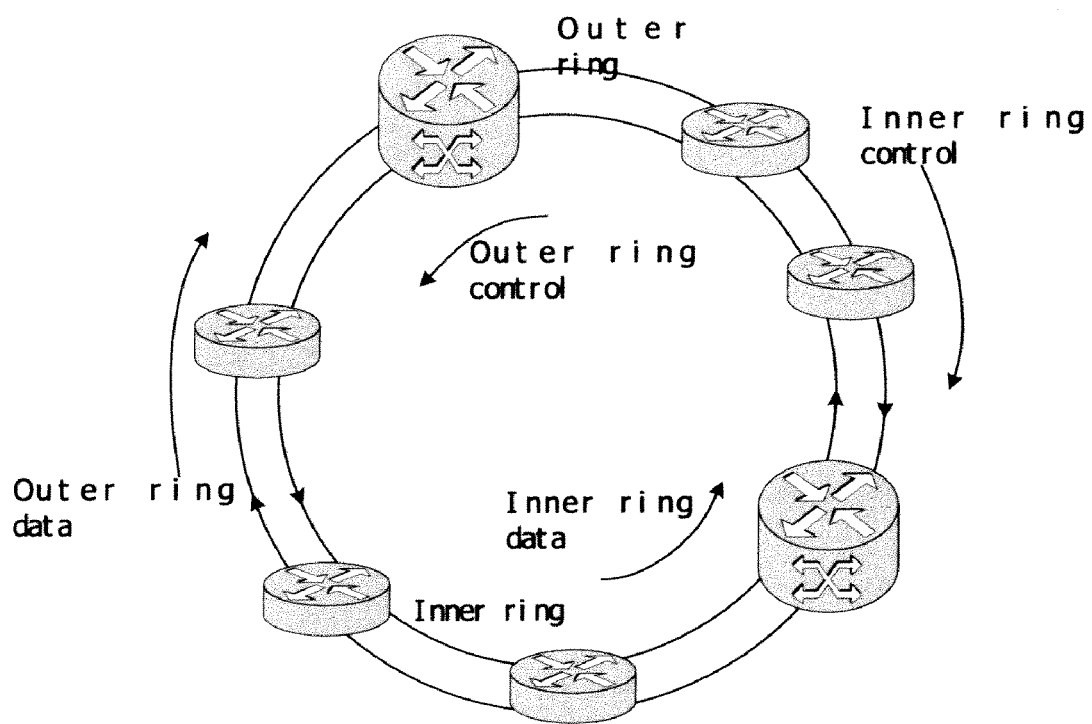
FIG. 1 shows a RPR with duplex fibers.
Figure 2:
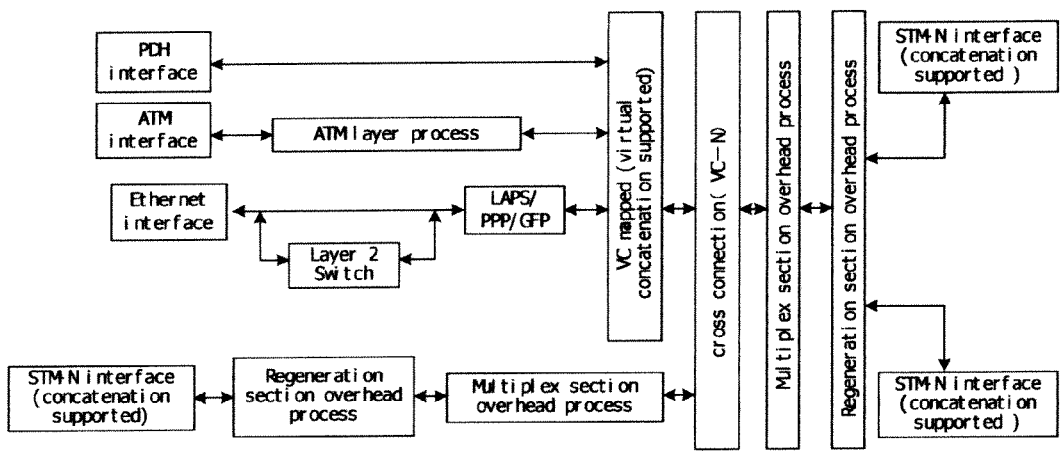
FIG. 2 shows a diagram for data traffic transmission of SDH equipment in prior art.
Figure 3:
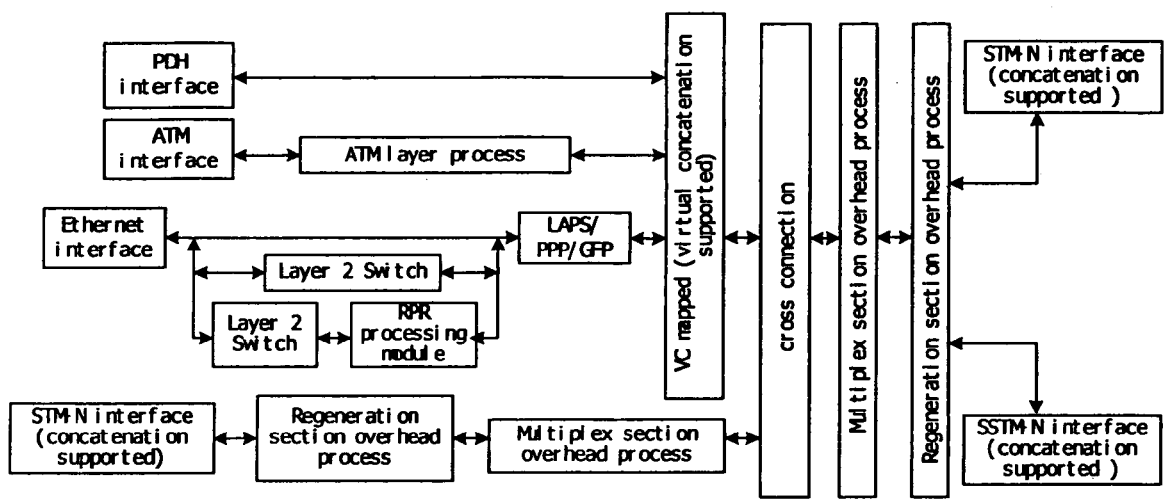
FIG. 3 shows a diagram for data traffic transmission of SDH equipment of the disclosure.

In order to implement RPR inserted on a SDH multi-service transport platform, the RPR processing module can be directly inserted after the Ethernet interface or after the Layer 2 Switch module. FIG. 3 shows that the RPR processing module is inserted after the Layer 2 Switch module. The uplink Ethernet frame from the Ethernet interface is encapsulated to a RPR frame through the RPR processing module, and then based on encapsulation protocol such as the Link Access Protocol (LAPS), Point-to-Point Protocol (PPP) or General Framing Protocol (GFP) etc., the RPR frame is mapped to the payload in SDH frame; the volume and the number of the SDH virtual containers are configurable. When the RPR frame reaches a destination node at RPR, it is stripped off the destination node and recovered to the original Ethernet frame.

Figure 4:
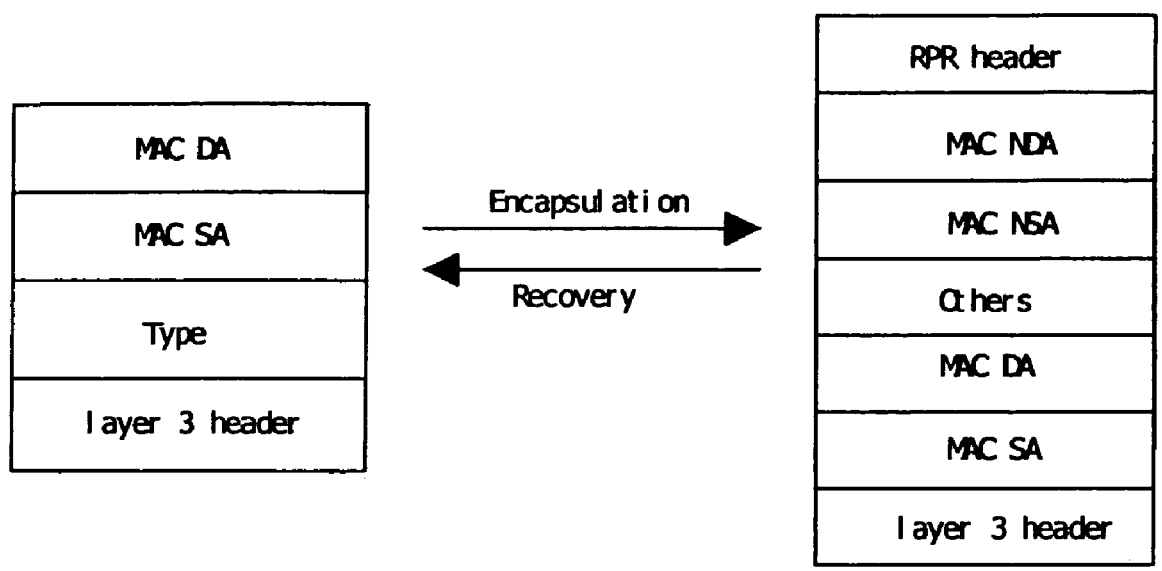
FIG. 4 shows an encapsulated Ethernet frame diagram of the disclosure.

The RPR frame is formed by adding a RPR packet header to the Ethernet frame, which can be done by a large-scale programmable logic chip or a network processor. The RPR frame of the disclosed method and device is shown in FIG. 4. The RPR header is based on the IEEE 802.17 draft. The MAC NDA and MAC NSA are respectively 48 bits and are filled with the SDH node number in this disclosure. The destination address of uplink Ethernet frame is associated with the number of the SDH node through self-learning of addresses. In other words, when the RPR header is added, destination address of uplink Ethernet frame is analyzed to find the number of the corresponding SDH node, and then the number is filled in MAC NDA, and the MAC NSA is filled with the number of the SDH node which sends out said frame.

Other field of the RPR frame is filled based on content of the transmitted Ethernet frame. There are three situations.

a. When the transmitted Ethernet frame is a data frame, the Other field is filled with the protocol type and the checksum of the RPR frame header, and then the user data and FCS;

b. When it is a fairness algorithm control frame, the Other field is filled with control information, and then it is followed by FCS without user data;

c. When it is a RPR control frame, the Other field is filled with the protocol type, checksum of the RPR frame header and control information without user data, and then it is followed by FCS.

Of course, the Other field may be filled with the 802.1Q VLAN Tag to provide more data services.

Finally, the Ethernet frame is appended to form the RPR frame, and thereby the Ethernet frame is transmitted transparently.

To adjust the ring bandwidth of the RPR dynamically, the RPR frames are mapped in virtual concatenated VC12, VC3 or VC4, so the total bandwidth of the whole SDH ring can be configured from 2 Mbps to N×VC4, at the same time the bandwidth parameter of the RPR controller is also adjustable. This is done as follows: first, adjusting the total bandwidth of the whole SDH ring through the virtual concatenation, and then adjusting RPR bandwidth through adjusting a weighted value of lower priority data-stream based on the RPR protocol draft; at the same time allocating a bandwidth for the uplink data-stream at the Layer 2 Switch module. When there is enough bandwidth, user data are transmitted as much as possible; and when there is congestion; data that exceed the allocated bandwidth is discarded. Therefore, RPR bandwidth can be adjusted. In addition, based on the fairness algorithm, each traffic bandwidth for the RPR nodes can be allocated according to requirements. Allocation method is the same as that of the bandwidth parameter of the RPR controller. In this way, bandwidth of the local SDH ring can also be allocated dynamically while the total bandwidth of the whole SDH ring is being allocated.

During transmission, the destination node at RPR strips off the RPR frame except broadcast frame. In other words, at the direction where the RPR frame leaves off the RPR, a node detects whether FCS in the RPR packet header is error; if it is, the frame is discarded; otherwise the MAC NDA is checked to determine whether it is consistent with this node number; if it is, the RPR frame is stripped off the RPR and the RPR packet header including RPR header, MAC NDA, MAC NSA and other information is taken off to recover the original Ethernet frame.

The disclosed method implements on SONET the same as on the SDH network mentioned above.

The invention claimed is:

1. A method for data traffic transmission on a synchronous digital network (SDH), comprising:
   A. adding a Resilient Packet Ring (RPR) processing module after an Ethernet interface;
   B. mapping an uplink Ethernet frame from the Ethernet interface to a RPR frame by the RPR processing module, wherein B comprises adding a RPR packet header to the uplink Ethernet frame to form the RPR frame by
      B1. analyzing an Ethernet frame destination address, and searching for a node number of an SDH node corresponding to the Ethernet frame destination address, filling the node number of the SDH node in a MAC NDA (MAC node destination address) field, filling the node number of the SDH node in a MAC NSA (MAC node source address) field, and adding a RPR header according to IEEE 802.17 protocol, and
      B2. based on said uplink Ethernet frame, filling an Other field of said RPR packet header;
   C. mapping the RPR frame to a SDH payload based on an encapsulation protocol; and
   D. stripping the RPR frame from a destination node at RPR, and recovering to its original Ethernet frame.

2. The method according to claim 1, wherein B2 comprises:
   if the Ethernet frame is a data frame, filling the Other field of said RPR packet header with a protocol type, a checksum of the RPR header, user data, and a frame checksum (FCS);
   if said Ethernet frame is an RPR fairness algorithm frame, filling the Other field of said RPR packet header with a fairness control information and the FCS;
   if said Ethernet frame is an RPR control frame, filling Other field of said RPR packet header with a protocol type, the checksum of the RPR header, the fairness control information and the FCS.

3. The method according to claim 1, wherein adding the RPR packet header to the uplink Ethernet frame is performed by a large-scale programmable logic chip or a network processor.

4. The method according to claim 1, wherein the encapsulation protocol is a Link Access Protocol (LAPS), a Point-to-Point Protocol (PPP), or a General Framing Protocol (GFP).

5. The method according to claim 1, wherein C comprises mapping the RPR frame to a virtual concatenated, configuring volume and mapping the RPR frame to a number of virtual containers, and adjusting a bandwidth of said SDH.

6. The method according to claim 5, wherein adjusting the bandwidth of said SDH comprises, allocating a traffic bandwidth for RPR nodes to make it so that a local bandwidth of the RPR can be dynamically allocated.

7. The method according to claim 1, wherein D comprises:
   D1. detecting whether a frame checksum (FCS) in the RPR frame is correct; if there is an error, discarding the RPR frame, otherwise going to D2;
   D2. detecting whether a MAC NDA (MAC node destination address) field of the RPR frame is consistent with a node number of a current node; if it is, stripping the RPR frame, otherwise forwarding the RPR frame to a next node; and,
   D3. taking off a RPR header, the MAC NDA field, a MAC NSA (MAC node source address) field and an Other field to recover to its original Ethernet frame.

8. A system for data traffic transmission on a synchronous digital network (SDH), comprising:
   an Ethernet interface having an uplink Ethernet frame;
   a Resilient Packet Ring (RPR) processing module coupled to the Ethernet interface;
   a RPR frame, wherein the uplink Ethernet frame is encapsulated to the RPR frame through the RPR processing module, and where a RPR packet header is added to the uplink Ethernet frame to define the RPR frame;
   a SDH payload, wherein the RPR frame is mapped to the SDH payload based on an encapsulation protocol, the RPR frame is stripped from a destination node at RPR, and the RPR frame is recovered to its original Ethernet frames;
   a destination address of the uplink Ethernet frame is analyzed;
   a node number of a SDH node, where the destination address of the uplink Ethernet frame is associated with the node number of the SDH node;
   a MAC node destination address (MAC NDA) field;
   a MAC node source address (MAC NSA) field; and
   an Other field of said RPR packet header is filled based on said uplink Ethernet frame;
   wherein the node number of the SDH node is filled in the MAC NDA field, the MAC NSA field, and the RPR header is based on an IEEE 802.17 protocol.

9. A method for data traffic transmission on a synchronous digital network (SDH) comprising:
   A. adding a Resilient Packet Ring (RPR) processing module after an Ethernet interface;
   B. mapping an uplink Ethernet frame from the Ethernet interface to a RPR frame by the RPR processing module; and
   C. mapping the RPR frame to a SDH payload based on an encapsulation protocol, mapping the RPR frame to a virtual concatenated, configuring volume and mapping the RPR frame number of virtual containers, and adjusting a bandwidth of the SDH, wherein adjusting the bandwidth of the SDH comprises adjusting a bandwidth parameter of a RPR ring controller, adjusting a weighted value of a lower priority data-stream based on a RPR protocol draft; at the same time configuring a bandwidth for an uplink data-stream at a Layer 2 Switch module, and when there is congestion, discarding data that exceeds bandwidth.

* * * * *